United States Patent
Schneider et al.

(10) Patent No.: US 9,182,825 B2
(45) Date of Patent: Nov. 10, 2015

(54) INPUT DEVICE COMPRISING A TOUCH-SENSITIVE INPUT SURFACE

(71) Applicant: AUDI AG, Ingolstadt (DE)

(72) Inventors: Johann Schneider, Wettstetten (DE); Marcus Kuehne, Ingolstadt (DE); Ulrich Mueller, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/371,953

(22) PCT Filed: Dec. 19, 2012

(86) PCT No.: PCT/EP2012/005242
§ 371 (c)(1),
(2) Date: Jul. 11, 2014

(87) PCT Pub. No.: WO2013/104400
PCT Pub. Date: Jul. 18, 2013

(65) Prior Publication Data
US 2015/0009178 A1 Jan. 8, 2015

(30) Foreign Application Priority Data
Jan. 13, 2012 (DE) .......................... 10 2012 000 586

(51) Int. Cl.
*G06F 3/041* (2006.01)
*G06F 3/01* (2006.01)
(Continued)

(52) U.S. Cl.
CPC ............ *G06F 3/016* (2013.01); *G06F 3/03547* (2013.01); *G06F 3/041* (2013.01); *G06F 3/044* (2013.01)

(58) Field of Classification Search
CPC ...... G06F 3/016; G06F 3/03547; G06F 3/041; G06F 3/044; G06F 1/1601; B25J 15/0033; B25J 9/0087; B25J 15/0253; B25J 18/00; B25J 15/0038; B25J 9/1612; B25J 19/023; B25J 9/06; B25J 9/161; B25J 9/1689; B25J 13/025; G01N 35/0099; B66C 1/42
USPC ..................... 345/173–183; 178/18.01–20.04
See application file for complete search history.

(56) References Cited

U.S. PATENT DOCUMENTS

2007/0057927 A1  3/2007 Prados
2008/0202824 A1  8/2008 Philipp et al.
(Continued)

FOREIGN PATENT DOCUMENTS

DE  10 2008 008 921 A1  9/2008
DE  10 2012 000 586.5      1/2012
(Continued)

OTHER PUBLICATIONS

Office Action issued Aug. 7, 2012 for corresponding German Patent Application No. 10 2012 000 586.5.
International Search Report mailed Jul. 15, 2013 for corresponding International Patent Application No. PCT/EP2012/005242.
(Continued)

*Primary Examiner* — Kent Chang
*Assistant Examiner* — Nelson Rosario
(74) *Attorney, Agent, or Firm* — Staas & Halsey LLP

(57) ABSTRACT

Input device has a touch sensitive input surface with a sensor for detecting the position of an object touching the input surface, an interface for transferring sensor data and a device for producing haptically detectable feedback, which is designed to move the input surface, which is mounted so as to be movable along an axis.

18 Claims, 2 Drawing Sheets

(51) Int. Cl.
*G06F 3/0354* (2013.01)
*G06F 3/044* (2006.01)

(56) References Cited

U.S. PATENT DOCUMENTS

| | | | |
|---|---|---|---|
| 2010/0073291 A1* | 3/2010 | Hisatsugu et al. | 345/161 |
| 2010/0199212 A1* | 8/2010 | Heers et al. | 715/784 |
| 2011/0141052 A1 | 6/2011 | Bernstein et al. | |
| 2011/0260988 A1 | 10/2011 | Colgate et al. | |
| 2012/0123636 A1* | 5/2012 | Hisatsugu | 701/36 |

FOREIGN PATENT DOCUMENTS

| | | |
|---|---|---|
| EP | PCT/EP2012/005242 | 12/2012 |
| WO | WO 2010/046494 A1 | 4/2010 |
| WO | WO 2010/055234 A1 | 5/2010 |

OTHER PUBLICATIONS

WIPO provided English translation of the International Preliminary Report on Patentability uploaded on the WIPO website on Aug. 1, 2014 for corresponding International Patent Application No. PCT/EP2012/005242.

* cited by examiner

INPUT DEVICE COMPRISING A TOUCH-SENSITIVE INPUT SURFACE

CROSS REFERENCE TO RELATED APPLICATIONS

This application is based on and hereby claims priority to International Application No. PCT/EP2012/005242 filed on Dec. 19, 2012 and German Application No. 10 2012 000 586.5 filed on Jan. 13, 2012, the contents of which are hereby incorporated by reference.

BACKGROUND

The invention relates to an input device with a touch sensitive input surface.

Input devices with touch sensitive input surfaces are being increasingly used in electronic equipment. Examples of this are portable media playback devices, mobile telephones etc. In addition, such input devices with a touch sensitive input surface are also used as user interfaces in motor vehicles. By the touch sensitive input surface, the user can carry out operating inputs, e.g. he can select a menu item from a menu with a plurality of selection options and thereby trigger a defined action. The input process takes place thereby in the simplest case by the user tapping the input surface with a finger; in addition he can carry out a sliding movement on the input surface with a finger in order to trigger a defined action. The user thus carries out a defined pattern of movement, wherein a special meaning or function is associated with a pattern of movement.

Conventional touch sensitive input surfaces comprise sensors, e.g. capacitive sensors, which are capable of detecting the position of an object in contact with the input surface. The sensor or the sensors can be of a matrix form here, so that the coordinates of the current position of the object can be obtained as sensor data. The object is e.g. a finger of a user touching the input surface. Said sensor data can either be processed directly in the input device or in an evaluation device connected thereto, for which the input device comprises an interface via which it is connected to another device.

A generic input device is known from US 2011/0141052 A1. The input device comprises a touch sensitive input surface, force sensors, which produce a corresponding signal in the event of an operation, being provided for detecting a user input. The input device is capable of producing haptically detectable feedback for the user.

An input device is known from US 2007/0057927 A1, especially for a vehicle, with a touch sensitive input surface and with an actuator that can displace the touch sensitive input surface, which is in the form of a touch screen, reciprocally along an axis.

An input device with haptically detectable feedback and a suitable actuator is known from WO 2010/055234 A1.

Similarly, WO 2010/046494 A1 also discloses an input device with haptic feedback. In the event of a user input the input surface is moved by an actuator comprising an electromagnet.

A touch sensitive input surface is known from DE 10 2008 008 921 A1, with which besides detecting the position of the object touching the input surface, the triggering of a switch contact can also be provided. For this a switch is disposed under the touch sensitive input surface so that a switching process is triggered if the user exerts a sufficiently strong perpendicular force on the input surface, which thereby carries out a tilting movement. The input surface can comprise a device for producing haptically detectable feedback, which can take place as a vibration or by "clicking". By said haptically detectable feedback it is conveyed to the user that an input process has taken place.

However, investigations have shown that input devices in which the input surface is tapped are not optimal, because the perception of an unsteady device is conveyed to the user.

SUMMARY

One possible object of is therefore to specify an input device with a touch sensitive input surface that is of a stiff and robust design.

The inventors propose an input device of the above-mentioned type that the input surface is movably disposed on a carriage, which can be at least slightly rotated about a rotation axis that is perpendicular to the axis of motion of the input surface and that the at least one pressure sensor or force sensor is disposed on the carriage.

With the proposed input device the touch sensitive input surface is mounted so as to be horizontally displaceable and haptically detectable feedback is produced by the displacement of the input surface without the input surface tilting or seeming unsteady in any way. Because the input surface of the input device is designed to be stiff and robust, the feel of a particularly high quality input surface is conveyed to the user. The haptically detectable feedback can be produced if the user operates the input surface, i.e. if he presses his finger on the input surface. On reaching a threshold value for the force or the pressure, the haptically detectable feedback is produced. Likewise, haptically detectable feedback can be produced following the release of the input surface. The movement of the movably mounted input surface along the axis is perceived as a haptic click, thus the user receives haptic feedback on operating (pressing) and/or on releasing the input surface as with a conventional pushbutton.

With the input device it is provided that the input surface is movably disposed on a carriage, which can be rotated at least slightly about an axis perpendicular to the axis of motion of the input surface. By the carriage, a movement about an axis perpendicular to the axis of motion of the input surface is enabled, thus a force or a corresponding pressure acting perpendicular to the input surface can be detected. The detection of the force offers the possibility, after exceeding the threshold value, for the force or the pressure to trigger an action, e.g. a selection process in an operating menu. Although the carriage can in principle carry out a rotary motion about a fixed rotation point, the distance covered in practice during the operation is small. The carriage is in the form of a lever and is mounted on an end point of the lever, whereby the rotary motion provided is enabled. In order to be able to detect a control input of the user better, it is provided that at least one pressure sensor or force sensor for detecting a force or a pressure acting perpendicularly on the input surface is disposed on the carriage. Alternatively, it can be provided that two or more pressure sensors or force sensors, which are at a distance from each other, are disposed on the carriage. Because the position of the object (finger) on the touch sensitive input surface can be detected, the force applied to the contact point by the user can be computed using the information detected by the pressure sensor or force sensor by using the law of leverage. Accordingly, the actual contact force can be computed for each contact point on the touch sensitive input surface.

According to a development, it can be provided that the pressure sensor or force sensor, which is disposed in the vicinity of the carriage, is in the form of a non-displacement sensor. Because the rotary motion of the carriage is small in comparison to its extent, a non-displacement sensor can be used in order to measure the pressure or the force. Preferably, the non-displacement sensor can be in the form of strain gauges, such sensors having the advantage that they are practically free of wear.

In order to enable very accurate detection of the force or of the pressure, the input surface can be disposed in or on the carriage between the rotation point and the pressure sensor or force sensor. The carriage, which is preferably in the form of a lever, is thus mounted at its rotation point, the input surface, which is movable along an axis, is located on the lever or the carriage and the pressure sensor or force sensor is disposed on the other (free) end of the lever (carriage). This enables the force or the pressure to be detected with particularly high accuracy.

The device for producing the haptically detectable feedback is in the form of an electromechanical actuator. The actuator can e.g. comprise an electric motor, a stroke magnet or a magnetic coil (solenoid coil), each of said components being capable of moving the touch sensitive input surface back and forth along its axis of motion, whereby the haptically detectable feedback results.

In order to further improve the handling of the input device, it can be provided that the input surface is guided or mounted laterally in a pointwise or linewise manner. Said mounting thus prevents tilting of the input surface perpendicularly to its direction of motion. Preferably, the input surface can be mounted on its opposite sides. Said mounting limits the degrees of freedom of movement, the input surface can thus only be moved in one axis along its direction of motion by the actuator, and in addition the user can trigger a slight rotary motion by a pressure acting on the input surface, which can be detected by the pressure sensor or force sensor.

In addition, the inventors propose a motor vehicle. The motor vehicle comprises an input device of the described type.

Preferably, the input device is mounted in the motor vehicle such that the input surface can carry out a lateral movement, i.e. the input surface is moved from left to right and back again when viewed from the driver's seat.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
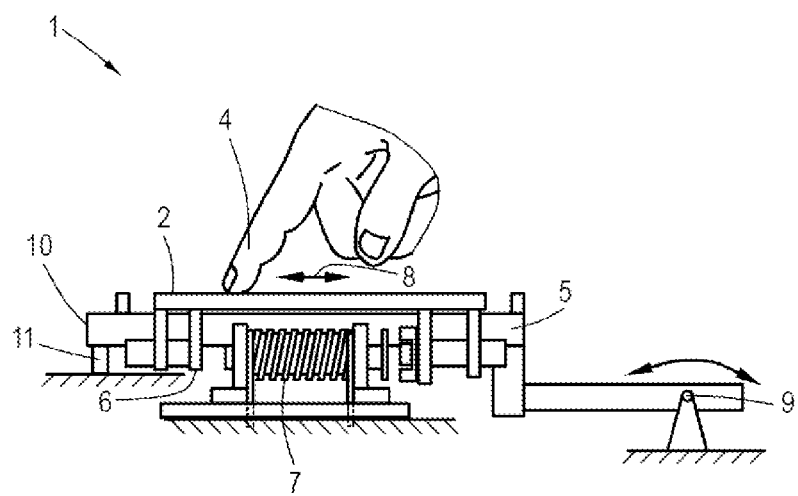
FIG. 1 shows an exemplary embodiment of a proposed input device in a lateral view.

Reference will now be made in detail to the preferred embodiments of the present invention, examples of which are illustrated in the accompanying drawings, wherein like reference numerals refer to like elements throughout.

Figure 3:
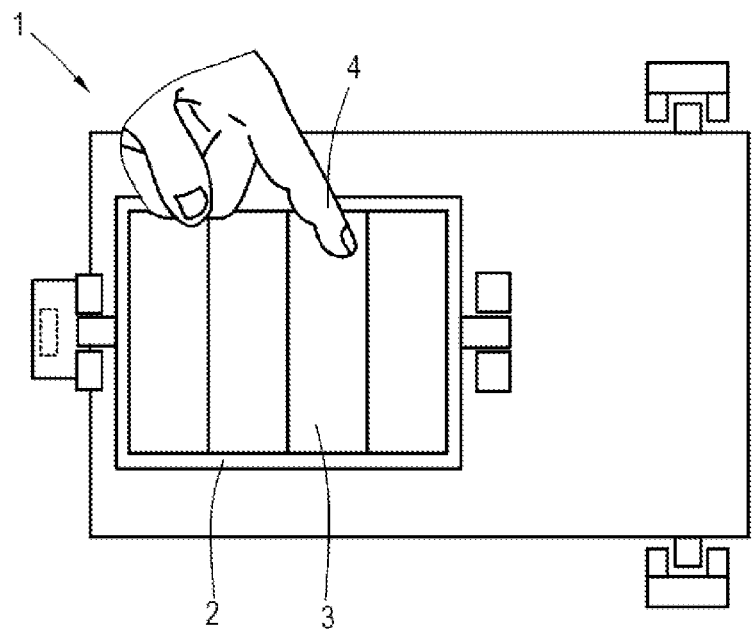
FIG. 3 shows another plan view onto the input device of FIG. 1.

The input device 1 shown in FIG. 1 in a lateral view comprises a touch sensitive input surface 2. FIG. 3 is a plan view of the input device 1 of FIG. 1, in which it can be seen that the input surface 2 comprises a plurality of planar capacitive sensors 3, which enable the position of the contact points of an object 4 on the input surface 2 to be precisely detected. Such sensors 3 are known and they comprise an x-y matrix so that the position of the contact points is detected in the form of coordinates and can be transmitted via an interface for evaluation.

In the illustrated exemplary embodiment, the input surface 2 is of rectangular form and is disposed on a carriage 5. Attachment elements 6 are provided below the input surface 2, but the input surface 2 is not fixedly joined to the carriage 5 but can move along an axis on the carriage 5. Below the carriage 5 there is an electromagnetic actuator 7, which is capable of moving the input surface 2 attached above the carriage 5 in the direction of the double arrow 8. When the actuator 7 is operated, the input surface 2 carries out a controlled reciprocal movement, which is perceived by the user as haptically detectable feedback. This enables the user to be given feedback when he touches the surface of the input surface 2, wherein the contact must take place optionally with a certain minimum force. Alternatively or additionally, the haptically detectable feedback can also be conveyed to the user when he releases the input surface 2 again.

In FIG. 1 it can be seen that the carriage 5 is in the form of a lever, one end of the carriage 5 being rotatable about a rotation axis 9. When using the input device 1 the rotation is, however, limited to a very small angular range. When at rest the carriage 5 lies with its end 10 opposite the rotation point 9 on a pressure sensor 11. In the illustrated exemplary embodiment the pressure sensor 11 is in the form of strain gauges, moreover with other exemplary embodiments the pressure sensor 11 can also be in the form of load cells or similar. It is important here that the pressure sensor or force sensor provides a sensor signal that is a measure of the pressure or the force that is produced by a user when touching the input surface 2. The use of a non-displacement sensor, especially of a strain gauge, as the pressure sensor 11 has the advantage that the non-displacement sensor is practically free of wear and can also detect a small rotation of the carriage 5 leading to a force change or a pressure change. Because the pressure sensor 11 is attached to the free end of the carriage 5, the force applied by the object 4 (the finger of the user) can be detected particularly accurately.

If the object 4 is located at different points on the input surface 2, different pressure values or force values—caused by different distances between the object 4 and the pressure sensor 11—are detected, and it is therefore necessary to convert the value detected by the pressure sensor 11 by the law of leverage. Because at the same time the position of the object 4 on the input surface 2 is detected by the input surface 2, the lever length or the distance between the object 4 and the pressure sensor 11 perpendicular to the force direction is known. The pressure value or force value detected by the pressure sensor 11 can thus be converted. Following the conversion, the actual values for the force or the pressure are comparable, therefore a defined threshold value can be specified for the force or the pressure. On exceeding the threshold value, an action is triggered, e.g. a user input is considered to have been carried out if the force or the pressure applied by the user exceeds a defined threshold value. Similarly, an action can be triggered if the pressure or the force falls below a threshold value, e.g. haptically detectable feedback can be produced by the actuator on falling below a specified threshold value 7.

Figure 2:
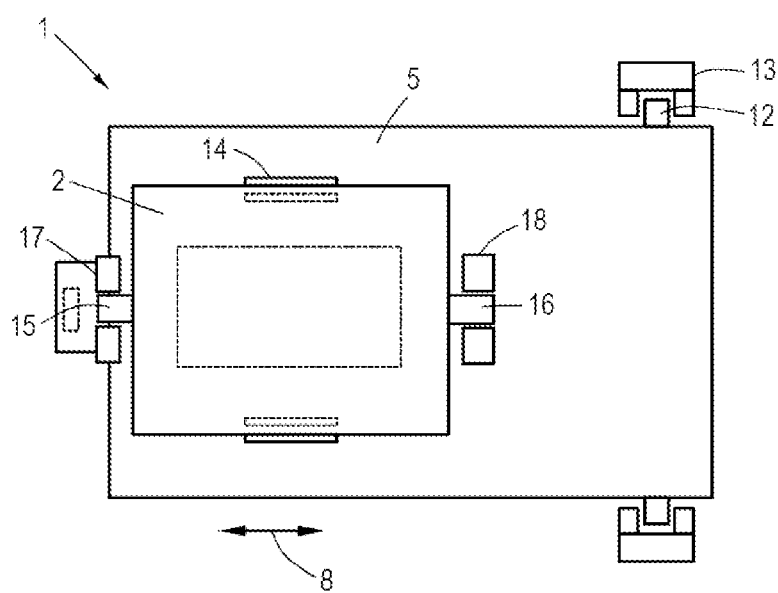
FIG. 2 shows a plan view onto the input device of FIG. 1.

It can be seen in FIG. 2 that the carriage 5 comprises protruding journals 12 in the vicinity of the rotation axis 9, which are rotatably accommodated in a receptacle 13. The two opposing journals 12 and the respective receptacles 13 together form a rotary bearing, which enables rotation of the carriage 5 about the rotation axis 9.

In FIG. 2 it can also be seen that the input surface 2 is supported on lateral bearing points 14 in order to prevent tilting of the input surface 2 during contact by the user.

The input surface 2 comprises bearing elements 15, 16 on opposite ends, which are in the form of protruding journals and which interact with identically formed bearing elements 17, 18 of the carriage 5. The input surface 2 is thus axially movable relative to the carriage 5 along the axis indicated by the double arrow 8.

The input device 1 explained using FIGS. 1-3 is a component of a motor vehicle and is disposed such that the input surface 2 can carry out a lateral movement.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. An input device comprising:
   a carriage which can be at least slightly rotated about an axis of rotation;
   a touch sensitive input surface mounted on the carriage to be movable along an axis of movement with respect to the carriage, the axis of movement being perpendicular to the axis of rotation, the input surface having a plurality of capacitive sensors to detect a position of an object touching the input surface and to produce sensor data;
   an interface to transfer the sensor data;
   a force sensor or pressure sensor to detect a force or a pressure acting perpendicularly on the input surface, the force sensor or pressure sensor being disposed on the carriage; and
   a device to produce haptically detectable feedback, the device comprising an electromechanical actuator to move the input surface along the axis of movement, the haptically detectable feedback being produced when the object touches the input surface and the force or pressure applied via the object exceeds or falls below a defined threshold for the force sensor or pressure sensor.

2. The input device as claimed in claim 1, wherein
   the carriage is pivotable about the rotation axis, and
   the axis of rotation lies outside the input surface.

3. The input device as claimed in claim 1, wherein the electromechanical actuator comprises an electromagnet to cause a reciprocal movement of the carriage when the electromechanical actuator is operated.

4. The input device as claimed in claim 1, wherein
   the force sensor or pressure sensor is in the form of a non-displacement sensor.

5. The input device as claimed in claim 1, wherein
   the force sensor or pressure sensor is a strain gauge.

6. The input device as claimed in claim 1, wherein
   the input surface is disposed in or on the carriage between the rotation axis and the force sensor or pressure sensor.

7. The input device as claimed in claim 1, wherein
   the input surface extends from a first end surface to a second end surface, and
   the input surface is disposed in or on the carriage between the rotation axis and the force sensor or pressure sensor such that rotation axis is positioned adjacent to the first end surface and the force sensor or pressure sensor is adjacent to the second end surface.

8. The input device as claimed in claim 1, wherein
   the input surface is guided or mounted laterally on or in the carriage in a pointwise manner.

9. The input device as claimed in claim 1, wherein
   the input surface has opposite sides, and
   the opposite sides are mounted to the carriage in a linewise manner.

10. The input device as claimed in claim 1, wherein
    the input surface has opposite sides, and
    at least two bearings are provided between the carriage and the input surface to prevent rotation of the input surface with respect to the carriage.

11. The input device as claimed in claim 1, wherein
    the carriage is provided as a lever having a rotating end and a free end,
    the rotation axis is provided at the rotating end, and
    the input surface is provided toward the free end, away from the rotating end.

12. The input device as claimed in claim 11, wherein
    the carriage has a lateral direction extending from the rotating end to the free end, and
    the axis of movement is in the later direction.

13. The input device as claimed in claim 11, wherein the force sensor or pressure sensor is provided at the free end of the carriage.

14. The input device as claimed in claim 13, wherein
    the capacitive sensors determine a lateral contact position on the input surface where the object touches the input surface,
    the lateral position on the input surface is used to determine a lateral contact position on the carriage between the rotating and the free end of the lever,
    the force or pressure detected by the force sensor or pressure sensor is converted to an actual force or pressure based on the lateral contact position on the carriage, and
    the actual force or pressure is compared with the predefined threshold.

15. The input device as claimed in claim 13, wherein
    the carriage rotates about the axis of rotation, which respect to a base, and
    the force sensor or pressure sensor is mounted between the carriage and the base.

16. The input device as claimed in claim 1, wherein
    the carriage rotates about the axis of rotation, with respect to a base, and
    the force sensor or pressure sensor is mounted between the carriage and the base.

17. A motor vehicle, comprising an input device, the input device comprising:
    a carriage which can be at least slightly rotated about an axis of rotation;
    a touch sensitive input surface mounted on the carriage to be movable along an axis of movement with respect to the carriage, the axis of movement being perpendicular to the axis of rotation, the input surface having a plurality of capacitive sensors to detect a position of an object touching the input surface and to produce sensor data;
    an interface to transfer the sensor data;
    a force sensor or pressure sensor to detect a force or a pressure acting perpendicularly on the input surface, the force sensor or pressure sensor being disposed on the carriage; and
    a device to produce haptically detectable feedback, the device comprising an electromechanical actuator to move the input surface along the axis of movement, the haptically detectable feedback being produced when the object touches the input surface and the force or pressure applied via the object exceeds or falls below a defined threshold for the force sensor or pressure sensor.

18. The motor vehicle as claimed in claim 17, wherein the input device is mounted such that the input surface can carry out a lateral movement.

\* \* \* \* \*